Jan. 15, 1924. 1,480,691

G. J. RACKHAM

GRIP PULLEY

Filed June 17, 1922 2 Sheets-Sheet 1

Inventor
G. J. Rackham
by his Attorneys
Baldwin Wight

Jan. 15, 1924.　　　　　　　　　　　　　　　　　1,480,691
G. J. RACKHAM
GRIP PULLEY
Filed June 17, 1922　　　　　2 Sheets-Sheet 2
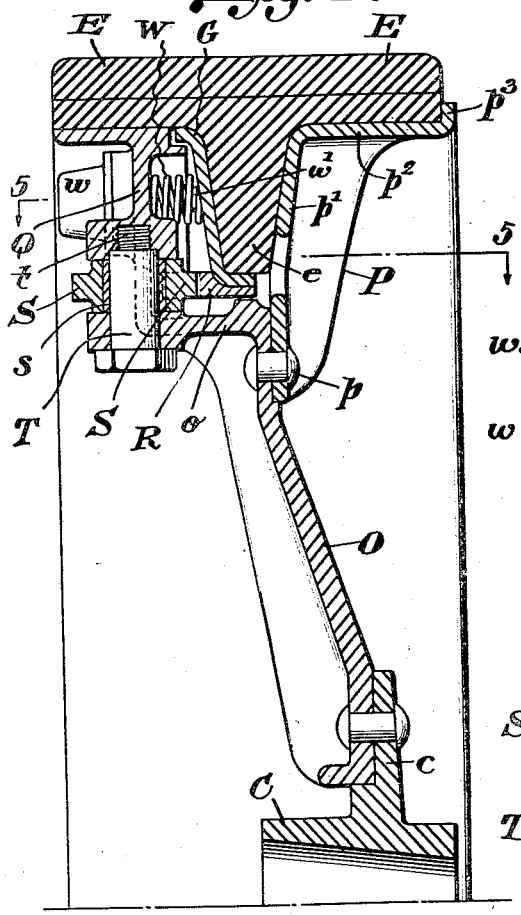
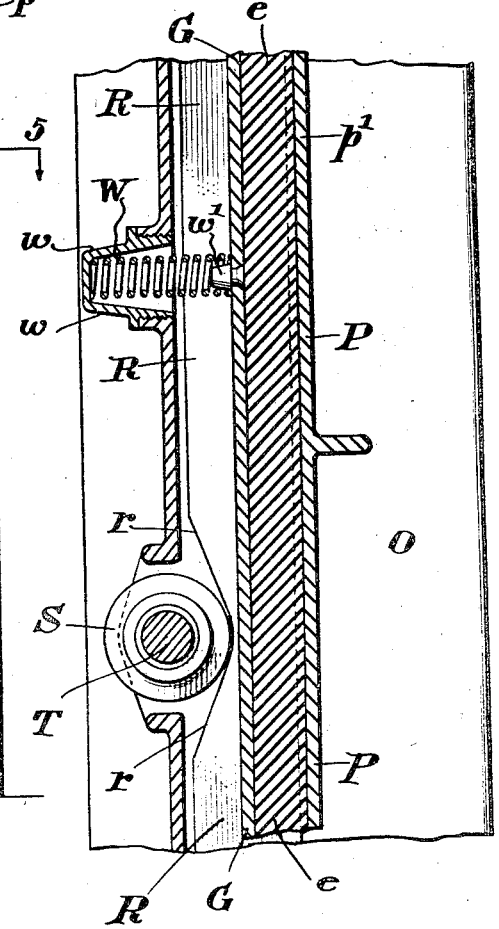
Inventor
G. J. Rackham
by his Attorneys
Baldwin & Wight Patented Jan. 15, 1924.

1,480,691

UNITED STATES PATENT OFFICE.

GEORGE JOHN RACKHAM, OF PUTNEY, LONDON, ENGLAND, ASSIGNOR TO ROADLESS PATENTS HOLDING COMPANY, OF WASHINGTON, DISTRICT OF COLUMBIA, A CORPORATION OF DELAWARE.

GRIP PULLEY.

Application filed June 17, 1922. Serial No. 568,895.

*To all whom it may concern:*

Be it known that I, GEORGE JOHN RACKHAM, a subject of the King of Great Britain, residing at Putney, London, England, have invented certain new and useful Improvements in Grip Pulleys, of which the following is a specification.

This invention relates to belt pulleys of the kind in which provision is made for firmly gripping the belt with which the pulley is associated when there is a tendency for the latter to slip on the former or where the pulley runs ahead of the belt, and the object of the invention is to provide improved means whereby when the belt starts to slip it will be automatically gripped and carried forward without appreciable lost motion.

Briefly stated, the invention consists in providing the peripheral portion of the pulley with a gripping member which normally engages a rib, flange or series of teeth on the inside of the belt and normally revolves coincidentally therewith and with other parts of the pulley, but which when the belt slips is retarded and is caused, by devices with which it is associated, to quickly and firmly grip the belt so that the normal relation of the belt and pulley is immediately restored.

More specifically the invention consists in providing a pulley body which is keyed to a centrally arranged axle and which is provided in its peripheral portion with a flange engaging the belt on one side of the centrally arranged rib or flange of the belt and which is provided also with another portion or section which engages the belt on the opposite side of the belt rib. This last mentioned section of the pulley is detachably connected with the body of the pulley and this detachable section supports a series of pivotally mounted cams, which engage an annular recessed rail secured to the gripping member, the arrangement being such that when the gripping member is moved circumferentially relatively to the remainder of the pulley, or the other parts of the pulley run ahead of the gripping member, said gripping member is given a lateral movement which causes it to grip the belt in the manner before described. Preferably the gripping member is held yieldingly in engagement with the rib of the belt by springs arranged at intervals around the pulley.

In a modified construction, the pivoted cams are replaced by rollers which engage an annular rail carried by the gripping member and formed with cammed recesses into which the inner ends of the rollers extend.

In the accompanying drawings:—

Figures 4 and 5 are on an enlarged scale.

Figure 4 is a sectional view showing a modified way of operating the gripping member.

Figure 5 shows a section of the pulley on the line 5—5 of Figure 4.

Figure 1:
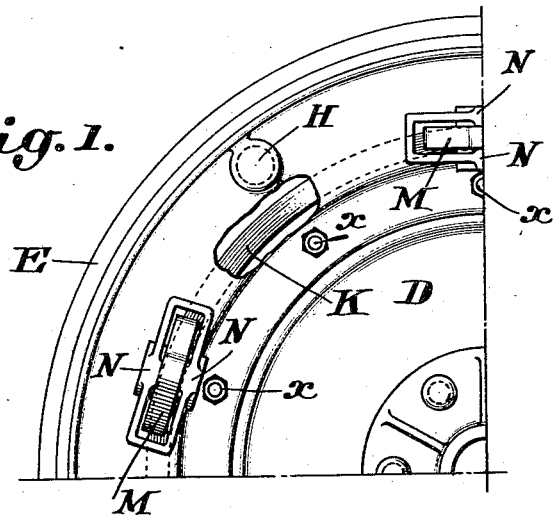
Figure 1 is a side elevation of a portion of a belt pulley with my improvements applied.
Figures 2, 3:
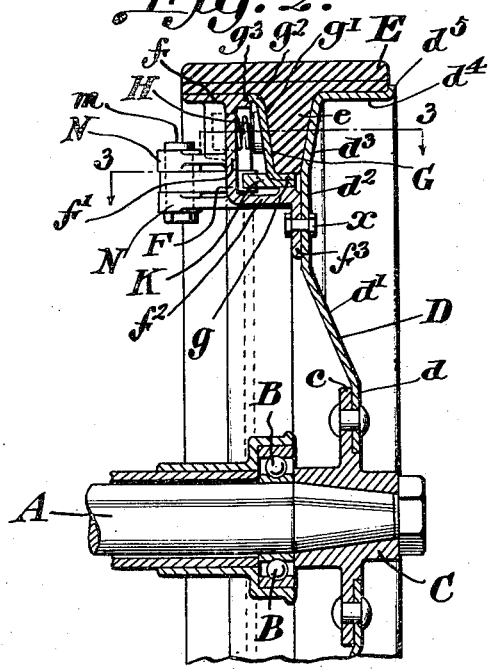
Figure 2 is a sectional view thereof.
Figure 3 shows a section of a portion of the pulley on the line 3—3 of Figure 2.

Referring to Figures 1, 2 and 3, an axle to which the pulley is secured is indicated at A, and B indicates ball bearings in which the axle is supported. The pulley hub C is secured to the axle in any suitable way. The web or body D of the pulley is preferably of the form shown, having an inner part $d$ secured to the hub flange $c$, an inclined part $d'$, a straight part $d^2$, an outwardly inclined part $d^3$, and a flange $d^4$ concentric with the axis of the pulley. The outer edge of the flange $d^4$ is preferably formed with a bead $d^5$.

The pulley is associated with a belt E having on its inner side a rib or flange $e$ which may be continuous or divided into a series of teeth. Preferably the rib is tapered as shown and one side of the rib is engaged by the inclined part $d^3$ of the pulley. The inner side of the belt on the opposite side of the rib is engaged by a pulley member F, the outer portion $f$ of which is concentric with the axis of the pulley and is annular or continuous. The web $f'$ extends inwardly from the part $f$ and is spaced some distance from the rib $e$ of the belt. The part $f^2$ is continuous and concentric with the axis of the pulley and the part $f^3$ is detachably connected by bolts $x$ to the part $d^2$ of the pulley section D. The member F is made detachable in order that other parts of the pulley may be properly assembled.

A gripping member G is interposed between the sections F and D. This member is preferably Z-shaped in cross-section. Its lower portion $g$ is adapted to engage the inner edge of the rib $e$, and the inclined side $g'$ is adapted to engage one side of the rib. The upper bent edge $g^2$ of this member enters a recess $g^3$ in the member F. This is the preferred construction. The gripping member G is held in contact with the rib $e$ of the belt by springs H. Any desired number of springs may be employed, the opposite ends of each spring being seated in recesses $h$ and $h'$ in the members F and G as shown in Figure 3.

An annular rail K concentric with the axis of the pulley is secured, as by welding, to the member G and this rail is formed with recesses $k$ to receive the inner portions of cams M extending through openings in the member F and pivoted at $m$ to arms N extending outwards from the member F. The cams shown are of triangular shape although this form of cam is not essential. As indicated in Figure 3, each cam enters a recess $k$ in the rail K and it is apparent that if the member G be moved circumferentially relatively to the member F, the cams are turned and a lateral movement is imparted to the gripping member. Therefore, if, in the operation of the mechanism, the belt starts to slip on the pulley or the pulley runs ahead of the belt the rotary movement of the gripping member G will be retarded while the other portions of the pulley continue to rotate at the normal speed. This relative movement of the pulley members causes the lateral movement of the gripping member and in this way the belt is firmly connected with the pulley by an instantaneous operation so that there is practically no lost motion.

It will be observed that normally the belt is carried forward by the pulley by reason of the contact of the parts $f$ and $d^4$ with the inside of the belt, while the gripping member G is carried around with the other parts by reason of its contact with the rib $e$ of the belt, and this member G also serves to carry the belt forward in the normal operation of the pulley, but said member G as before stated is capable of a relative circumferential movement independent of the movement of the other parts of the pulley and in this way the gripping action is performed as just described.

I have shown my improvements applied to a pulley associated with a belt which may be made of rubber or rubber and canvas, such as may be used on a tractor or similar motor driven vehicle, but it is obvious that my invention may be applied to pulleys used for various other purposes.

In Figures 4 and 5, those parts which are similar to parts shown in Figures 1, 2 and 3 are similarly lettered. In this case, however, while the essential features of the invention are the same, details of construction are somewhat different. The hub C of the pulley has secured to it a web O which is formed at its outer end with an annular peripheral portion $o$ which extends concentrically around the axis of the pulley. To the web O is secured by bolts $p$ a section P which has an inclined portion $p'$ adapted to engage the rib $e$ of the belt and a part $p^2$ adapted to engage the under side of the belt on one side of the rib. This part $p^2$ is also preferably formed with a bead $p^3$. The under side of the belt on the opposite side of the rib $e$ is engaged by a detachable pulley section Q which is supported on the peripheral flange $o$ of the section O. Between the section Q and the rib $e$ of the belt is interposed the gripping member G similar to the gripping member shown in Figures 1, 2 and 3. This gripping member G carries a rail R which is continuous and surrounds the axis of the pulley. It is formed with recesses $r$ having walls as indicated in Figure 5. The flange $o$ of the member O supports rollers S which enter the recesses $r$ of the rail R. These rollers may be supported in various ways. As shown, the rollers rest on the flange $o$ and are provided with bushings $s$ through which extend bolts T which are threaded at $t$ and engage in threaded sockets in the member Q. As shown, the rollers S are mounted to turn concentrically about the axes of the bolts T, but they may be eccentrically arranged for purposes of adjustment. The gripping member G is normally pressed toward or into contact with the rib of the belt by springs W mounted in the manner most clearly indicated in Figure 5, one end of the spring entering a housing $w$ and the inner end of the spring being supported on a knob $w'$. Any suitable number of such springs arranged around the axis of the pulley may be employed. The action of the mechanism is similar to that shown in Figures 1, 2 and 3 and need not be specifically described further than to say that when the belt starts to slip on the main sections of the pulley, the gripping section, which at times moves circumferentially relatively to the other section, is also given a lateral movement to cause the gripping action which compels the belt to quickly adhere to the pulley and with but little lost motion continue the normal operation.

I claim as my invention:—

1. A grip pulley adapted to be associated with a belt having a rib or flange on its inner side, comprising sections engaging the inner side of the belt on opposite sides of the rib, and a gripping member interposed between the pulley sections, and engaging the rib of the belt and being associated with devices which automatically cause it to firmly grasp the ribbed part of the belt when the belt starts to slip on the pulley.

2. A grip pulley adapted to be associated with a belt having a rib or flange on its inner side, comprising pulley sections adapted to engage the under side of the belt on opposite sides of the rib, a gripping member interposed between said sections and adapted to engage the rib, means for normally holding the gripping member in engagement with said rib, and devices operating upon said gripping member to move it laterally relatively to the pulley sections into firm engagement with the rib when the belt starts to slip.

3. A grip pulley adapted to be associated with a belt having a rib or flange on its inner side, comprising two sections mounted to revolve with a centrally arranged axle and having outer portions engaging the inside of the belt on opposite sides of the rib, a gripping member movable relatively to the pulley sections both circumferentially and laterally and which engages the rib of the belt, a recessed rail carried by the gripping member, and devices entering the recesses of the rail whereby when the belt starts to slip a lateral movement is given to the gripping member to cause it to firmly grasp the belt and continue the normal operation of the pulley.

4. A grip pulley adapted to be associated with a belt having a rib or flange on its inner side, comprising pulley sections mounted to revolve with a centrally arranged axle and having parts adapted to engage the inner side of the belt on opposite sides of the rib, a gripping member interposed between the pulley sections, devices for yieldingly pressing the gripping member into engagement with the rib, a recessed rail carried by the gripping member, and pivotally mounted devices carried by one of the pulley sections and which enter the recesses of the rib whereby when the belt starts to slip on the pulley a gripping action is performed by the gripping member.

5. A grip pulley adapted to be associated with a belt having a rib or flange on its inner side, comprising a main pulley section, another pulley section detachably connected therewith and mounted to revolve with the main pulley section about a centrally arranged axle and to engage the belt on opposite sides of the rib, a Z-shaped gripping member interposed between the pulley sections and yieldingly held in engagement with the rib of the belt and having portions engaging the under side of the belt, one side of the rib and the inner face of the rib, and devices associated with the gripping member for causing it to firmly engage the rib when the belt slips on the pulley or the pulley runs ahead of the belt.

6. A grip pulley adapted to be associated with a belt having a rib or flange on its inner side, comprising two opposed sections, and a gripping member interposed between the pulley sections, and engaging the rib of the belt and being associated with devices which automatically cause it to firmly grip the ribbed part of the belt when the belt starts to slip on the pulley.

7. A grip pulley adapted to be associated with a belt having a rib or flange on its inner side, comprising two opposed sections, a gripping member interposed between said sections and adapted to engage the rib, means for normally holding the gripping member in engagement with said rib and said means operating upon said gripping member to move it laterally relatively to the pulley sections into firm engagement with the rib when the belt starts to slip.

In testimony whereof, I have hereunto subscribed my name.

GEORGE JOHN RACKHAM.